March 26, 1940.  G. R. SCOTT  2,195,097
METHOD OF MACHINING GLOBOIDAL WORM GEARS
Filed May 12, 1937  2 Sheets-Sheet 1
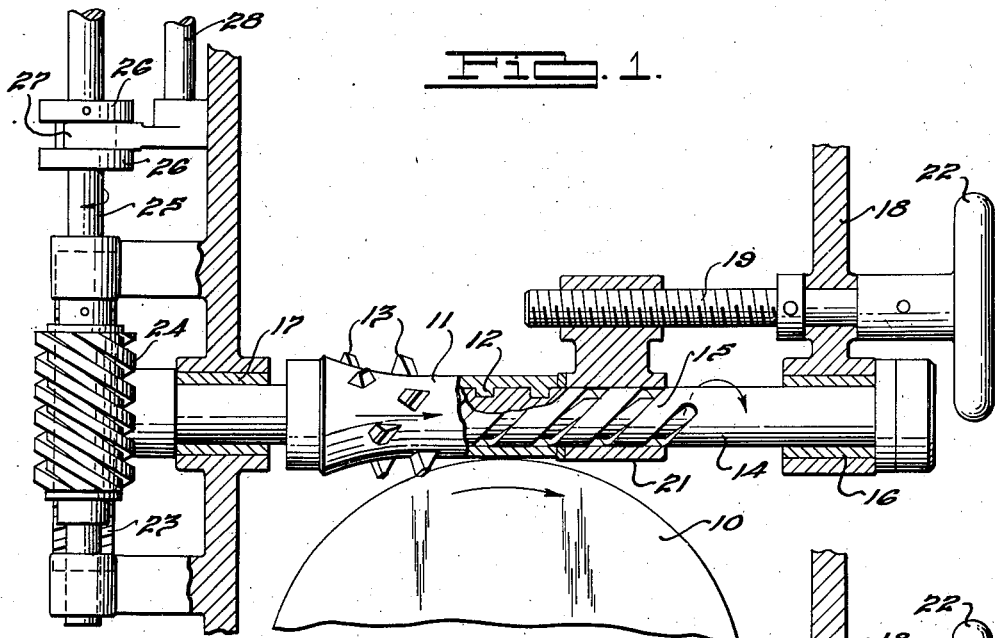
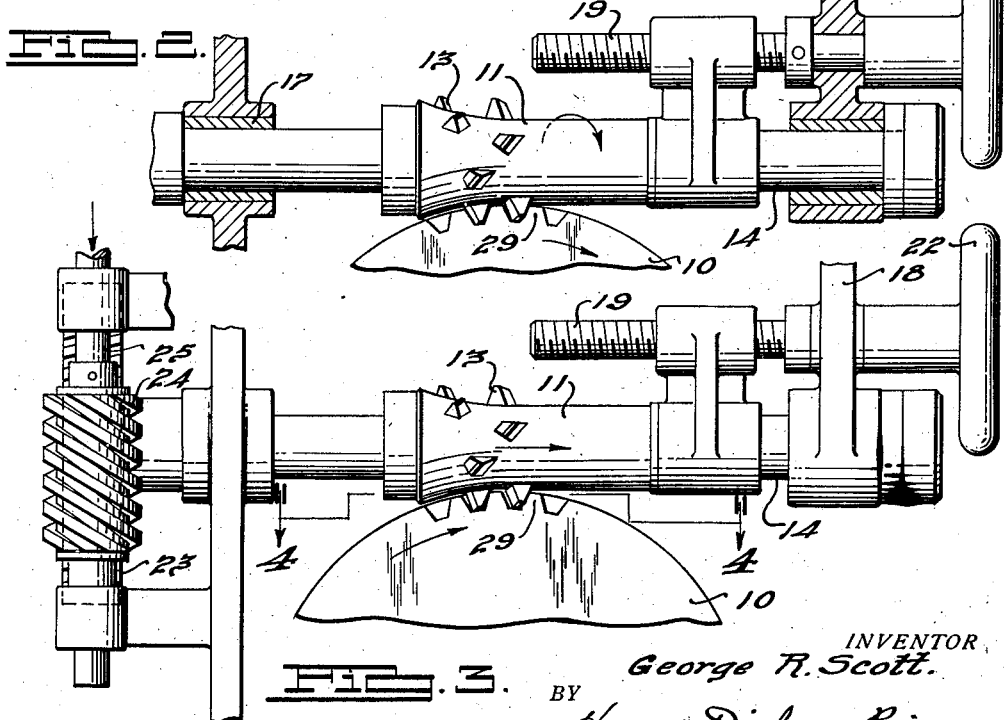
INVENTOR
George R. Scott.
BY
Harness, Dickey & Pierce
ATTORNEYS.

March 26, 1940.   G. R. SCOTT   2,195,097
METHOD OF MACHINING GLOBOIDAL WORM GEARS
Filed May 12, 1937   2 Sheets-Sheet 2
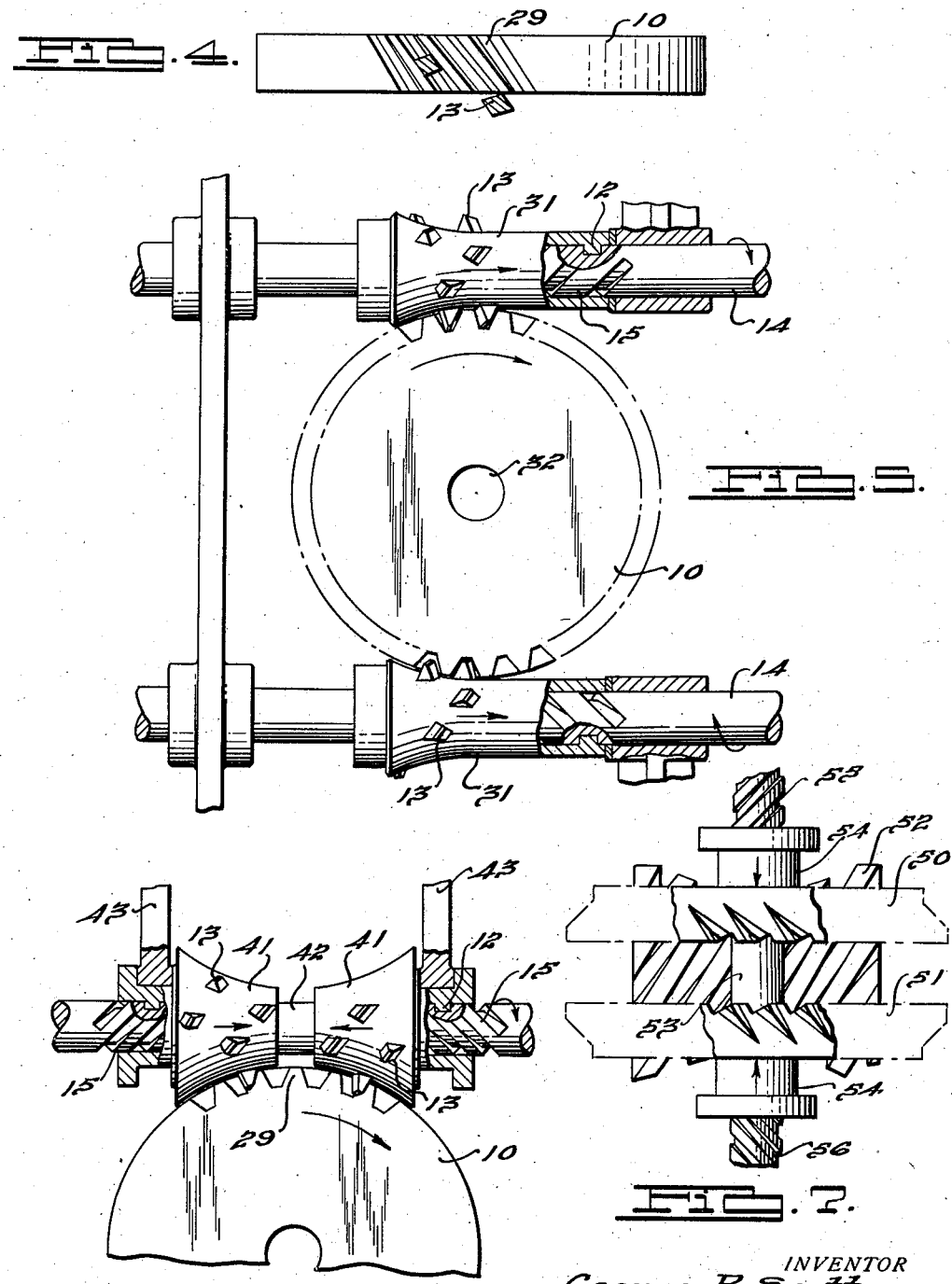

Patented Mar. 26, 1940

2,195,097

UNITED STATES PATENT OFFICE 2,195,097

METHOD OF MACHINING GLOBOIDAL WORM GEARS

George R. Scott, Detroit, Mich.

Application May 12, 1937, Serial No. 142,086

10 Claims. (Cl. 90—3)

My invention relates to methods and means for machining worm gear elements and particularly to a method and tool for accurately machining the flanks of the teeth of a worm or worm wheel through the axial feeding of the tool as it is simultaneously rotated substantially on the lead of the thread thereof.

When manufacturing worm gear sets of the enveloping type or double enveloping type, it is necessary to machine the thread of the worm and the teeth of the wheel in the central plane of the blanks. Finishing cuts must be taken when on correct center relation on lines tangent to the theoretical base circle of the wheel. When worm gear elements of the enveloping type are machined in this manner, surface engagement is obtained between the threads of the worm and the engaged teeth of the wheel. Heretofore, the machining was accomplished by a tool having teeth of narrower width than the gap to be ultimately formed between the thread and/or teeth of the worm gear element. A roughing operation occurred as the tool and blank were rotated in synchronism while their axes were advanced into correct center relation. It is well known that the "in" movement of the cutting edges in this manner deforms the teeth sides so that they lack mating capacity. The tool was then rotated to advance the cutting edges sidewardly to widen the gaps by the machining which occurred on correct center distances in the central plane of the blank. Correct forms were thereby produced on the teeth flanks.

While the present invention applies to machining either element of a worm gear set, I will describe in detail the machining of a worm gear with a half-hob or a plurality thereof, and make reference to the use of one or a pair of cutters for employing a similar method of machining for accurately forming teeth in the worm wheel.

In practicing my present method for machining worm gears, I utilize a half hob mounted with its axis in correct center relation with a worm gear blank but shifted axially out of exact mating relation with the blank. Such a half hob may be mounted in a machine having a multiple feed. This is to say a feed in rotation and one in translation to produce the rotation of the hob in synchronism with its advancement. Additional means may be provided in the machine to produce an increment of rotation when the hob has been advanced longitudinally into exact mating relation with the blank. While such a machine may be employed to operate the half-hob and blank in this manner, I have shown for the purpose of illustration a half-hob as a sleeve threaded on a shaft on a lead equal substantially to the mean helical lead of the teeth. I provide means for shifting the half-hob axially on the shaft to produce its rotation as it is tangentially fed relative to the blank. After the half-hob is so fed to reach its center relation with the blank, the machining of one side of the thread may be completed or additional means may be provided to advance the half-hob in rotation, while operating in synchronism with the blank, to machine one side of the gaps originally formed in the blank to accurate form.

A pair of half-hobs may be employed in this manner, one disposed above and the other below the blank to provide a balanced torque condition. The half-hobs may be so adjusted that when they reach their mating relation with the blank one side of the teeth of the blank will be accurately machined by one half-hob while the opposite side of the teeth will be accurately machined by the other half-hob.

Similarly the pair of hobs may be mounted on the same shaft and advanced toward each other during the time each is rotated on a lead substantially equal to the mean helical lead of the hob thread until they reach mated position where automatically the opposite sides of the wheel teeth will be accurately machined.

Accordingly, the main objects of my invention are to machine the worm gear elements through the tangential advancement of a tool relative thereto during the time the tool is rotated in synchronism with the advancement of a lead substantially equal to the mean helical lead of the worm thread; to machine worm wheel teeth with a half-hob by tangentially advancing the half-hob until in mated relation with the blank to rough out the teeth and thereafter, if necessary, to change the position of the hob in rotation to widen the gaps initially formed while machining accurate flanks on the teeth sides; to machine the teeth of a worm wheel by a pair of half-hobs which are mounted on opposite sides of the blank to provide a balanced torque condition and feeding the half-hobs tangentially in the same direction while rotated in synchronism substantially on the helical lead of the half-hob teeth; to have a pair of half-hobs so adjusted that after axial advancement into mating relation the teeth of one half-hob will finish one side of the teeth of the worm wheel while the teeth of the other half-hob will machine the opposite side of said teeth; to mount two half-hobs for axial movement toward each other and machining the teeth of a worm wheel blank through the movement of the hobs axially during the time they are rotated on a lead substantially equal to the mean lead of the half-hob teeth; to provide means for accurately adjusting the position of the hobs to have the tangential feeding thereof stopped when in accurate mating relation with the worm wheel blank; to have the teeth of one half-hob machine one side of the worm wheel teeth while the teeth of the other hob portion machines the opposite sides of said teeth, and in general, to provide means for accurately machining the teeth of worm gear elements which is positive in operation and economical of manufacture.

Other objects and features of novelty of my invention will be either specifically pointed out or will become apparent when referring, for a better understanding of my invention, to the following description taken in conjunction with the accompanying drawings, wherein:

Figure 1 is a broken view, partly in section and partly in elevation of apparatus embodying features of my invention;

Fig. 2 is a view of the structure illustrated in Fig. 1 after the tool has been moved into mating relation with a gear blank;

Fig. 3 is a view of the structure shown in Figs. 1 and 2 and disclosing the further turning movement applied to the tool to advance the cutting edges to widen the gap initially cut;

Fig. 4 is a sectional view of the structures illustrated in Fig. 3, taken on the line 4—4 thereof;

Fig. 5 is a view of structure, similar to that of Fig. 1, showing a further form which my invention may assume;

Fig. 6 is a view of structure, similar to that of Fig. 5, showing a further modified form of my invention, and Fig. 7 is a broken view, in elevation, of cutting tools for machining a worm gear by method embodying my invention.

In Fig. 1, I have illustrated a worm wheel blank 10, which is to be machined. A tool 11 in the nature of a half-hob is mounted in true center relation to the gear blank 10 but disposed axially at one side of its mating position sufficient to have the teeth out of engagement with the blank. The tool 11 is herein illustrated as a sleeve having a thread 12 cut on the inside thereof which has a helix angle which may be substantially equal to the mean helical lead of the teeth 13 of the tool. The sleeve is mounted on a shaft 14 which is provided with a thread 15 engaging the thread 12 of the sleeve. The shaft 14 is journaled at one end in a bearing 16 and at the opposite end in a bearing 17. The housing 18, carrying the bearing 16, also supports a lead screw 19 which regulates the position of a collar 21 which is slidable longitudinally of the shaft 14. The lead screw 19 is operated by a hand wheel 22.

The opposite end of the shaft 14 has a worm gear 23 keyed thereto and driven by a worm 24 which is mounted on a shaft 25. The shaft 25 is provided with a pair of spaced collars 26 in which is nested a bifurcated arm 27 carried on a rod 28. The rod 28 is mounted for longitudinal movement and employed for shifting the shaft 25 to move the worm 24 longitudinally to thereby provide an increment of rotation to the shaft 14. The shaft 25 is driven in synchronism with the spindle of the gear blank 10 (not shown) to provide the synchronised operation of the tool 11 and the blank 10.

During the operation the hand wheel 22 may be actuated to shift the sleeve 21 to the left to permit the longitudinal movement of the tool in that direction. This longitudinal movement of the tool occurs in synchronism with a movement in rotation and is effected through the engagement of the threads 15 and 12.

As the hand wheel is further operated the tool will continue to move to the right, as viewed in Fig. 1, until it reaches a mating position with the gear blank as illustrated in Fig. 2. In this position the teeth 29 of the blank are completely roughed out and if properly adjusted, one side of the teeth is finished. As pointed out hereinabove, the end feeding of the tool teeth into a blank of the enveloping type will produce deformed teeth thereon and for this reason the teeth 13 of the half-hob are of narrower width than the gap to be ultimately formed between the teeth 29 of the blank.

After the tool and blank have been disposed in mating relation on true center distances, when not adjusted to finish a side of the teeth, the rod 28 may be shifted a predetermined amount to move the worm 24 longitudinally as illustrated in Fig. 3. An additional movement in rotation is thereby imparted to the tool 11, resulting in the advancement of the lead of the teeth 13 of the half-hob relative to the teeth 29 of the blank. As a result, the gaps between the teeth 29 are widened by machining one side of the blank teeth in the central plane of the blank when the tool and blank are in exact mated position. The arbor of the tool or blank may then be shifted end for end and a machine opposition performed on the other side of the blank teeth to have both ends accurately spaced and formed.

In Fig. 4, I have illustrated the machining of the teeth 29 of the blank after the tool has been moved into exact mating relation therewith, to illustrate the widening of the gap due to the shifting of the teeth due to the rotation of the tool and the machining on the central plane of the blank with the cutting edges disposed on a tangent to its theoretical base circle.

In Fig. 5, I have shown a further form which my invention may assume. In this instance a pair of half-hobs 31 are employed which are similar to the half-hob 11 illustrated and described with reference to Figs. 1 to 4, inclusive. The half-hobs 31 are mounted on diametrically opposite sides of a spindle 32 of the gear blank 10 and are driven in opposite directions. The half-hobs 31 are fed longitudinally of the blank while their axes are maintained in true center relation until they reach mating position. The half-hobs 31 are so adjusted that the teeth of one half-hob cut the flanks of one side of the teeth of the blank while the teeth of the other half-hob cut the flanks of the opposite side of the teeth. A balanced torque condition results which is desirable and no additional feed movement is required when adjustment is made to widen the gaps through the operation of the half-hobs when disposed in exact mating position. While I have illustrated the half-hobs 31 as being sleeves having threads 12 mounted therein which engage the threads 15 on the shaft 14, it is to be understood that a machine having a differential movement may be employed for moving the half-hobs longitudinally as they are rotated substantially in accordance with the mean lead of the thread 12 in addition to the synchronised rotation of the tool and blank. Such differential movement advances the hob into true mating relation with the gear blank. It is to be understood that when adjustment is not maintained to have the half-hobs accurately finish both sides of the roughed out gaps, that an additional advancement of the teeth may then be made to effect the finishing operation as described with reference to the half-hob illustrated in Fig. 4.

In Fig. 6, I have shown a further form which my invention may assume. In this instance, a pair of half-hobs 41 are disposed on a single shaft 42. The half-hobs and the blank 10 are driven in synchronism while the half-hobs are advanced toward each other and rotated substantially on the mean lead of the thread of the half-hob teeth. The teeth 13 of the half-hobs will rough out the gaps between the teeth 29 of the blank during their synchronized movement toward each other and when reaching mating position with the blank will widen the gaps by having the teeth of one of the half-hobs cut away material on one side of the teeth 29 of the blanks while the teeth on the other half-hob will machine the opposite sides of said teeth. While a machine having differential movements may be employed for moving the half-hobs 41 towards each other into mating position, I have illustrated arms 43 which may be adjusted toward each other for effecting longitudinal movement which in turn produces synchronized rotation of the half-hobs 41 through the engagement of the teeth 15 upon the shaft 42 with the thread 12 of the half-hobs 41. When the infeeding of the hobs into mating relation produces only a roughing operation it is to be understood that the teeth may be advanced preferably by a turning movement as set forth above, to produce a finishing operation on the sides of the teeth.

In any instance, the machining of the teeth 29 of the blank occurs through the mounting of the tool on a shaft disposed in true center relation with the spindle of the blank but with the tool axially out of shifted mating relation. The roughing of the teeth occurs through the longitudinal movement of the tool toward mated position synchronized with an increment of rotation substantially on the mean lead of the hob teeth. After the hob has reached mating position it may be shifted in rotation to advance the cutting edges laterally to machine the flanks of the teeth to produce accurate tooth forms. When a single half-hob is employed the arbor of the blank or tool may be shifted end for end to machine the opposite side of the teeth flanks. When two of the half-hobs are employed they may be adjusted to automatically widen the gaps in the blank when they reach their mating position. One of the hobs will machine one side of the teeth while the other hob will machine the opposite sides of the teeth. The hobs may be disposed on the same shaft and move toward each other or be mounted on separate shafts and positioned diametrically opposite each other with reference to the blank to provide a balanced torque condition with relation to the blank arbor.

In Fig. 7 I have illustrated a pair of cutting tools 51 in position to operate to accurately machine a worm blank 52. This illustration was made to show how the principles explained in detail hereinabove for machining worm wheels with half-hobs may be employed for machining worm gears when utilizing one or a plurality of worm gear cutters. The cutters 50 and 51 per se, may be of any well known type but are preferably similar to those described and claimed in my co-pending application, Serial No. 735,975, filed July 19, 1934, for Cutting tool.

The example illustrated embodies the mounting of the pair of cutters 50 and 51 on a shaft 53 with the shanks 54 of the tools having an internal thread which engages threads 55 and 56 of the shaft. The threads are disposed substantially on the helix of the thread of the worm gear and effect the turning of the cutters in synchronism with their advancement during the time the cutters and worm gears are rotated in synchronism. When the cutters have advanced into the midplane of the worm the cutting edges on one side of the teeth of one cutter accurately machine one side of the grooves while the cutting edges of the other cutter finish the opposite side of the grooves. It is to be understood that a single cutter may be employed to be advanced along the axis of its arbor into the central plane of the worm gear and thereby accurately finish one side of the gap thereof, the opposite side of which may be finished through the shifting of the axis of the tool or worm gear end for end. It is also within the purview of my invention to dispose a cutter on opposite sides of the worm to provide a balanced torque condition with relation to the worm gear axis and move the tools axially into the plane of the worm gear and finish opposite sides of the gaps when in the said plane. It is to be understood that an additional increment of rotation may be provided to the cutters or worm gear to relatively advance the cutting edges laterally when disposed in the plane through the axis of the worm gear to effect a finishing operation to widen the initially formed gaps to a predetermined dimension.

While I have described and illustrated several embodiments of my invention, it will be apparent to those skilled in the art that various changes, omissions, additions and substitutions may be made therein without departing from the spirit and scope of my invention as set forth in the accompanying claims.

What I claim is:

1. The method of machining a worm gear element of the enveloping type wherein a tool with mating teeth will deform teeth being machined which includes the steps; of mounting the tool having teeth of less width than said mating teeth and blank on correct axis relation with the tool shifted from correct mated position, of driving the tool and blank in synchronism; of axially shifting the tool into mated position with the blank while the tool and blank are operating in synchronism, of imparting an additional movement in rotation to the tool in synchronism with said axial advancement, of accurately stopping said advancement at mated position to accurately machine one side of said gap without further adjustment, and of imparting a still further increment of movement in reverse rotation to said tool to machine the other side of said gap.

2. The method of machining a worm gear element of the enveloping type wherein a tool with mating teeth will deform teeth being machined which includes the steps; of mounting the tool having teeth of less width than said mating teeth and blank on correct axis relation with the tool shifted from correct mated position; of driving the tool and blank in synchronism; of axially shifting the tool into mated position with the blank while operating in synchronism; of imparting a movement in rotation to the tool in synchronism with said axial advancement; and of imparting an additional movement in rotation to the teeth of the tool when in mated relation with the blank to finish the sides of the blank teeth.

3. The method of machining a worm gear element of the enveloping type wherein a tool with mating teeth will deform teeth being machined which includes the steps; of mounting the tool having teeth of less width than said mating teeth and blank on correct axis relation with the tool shifted from correct mated position, of driving the tool and blank in synchronism; of axially shifting the tool into mated position with the blank while operating in synchronism; of imparting a movement in rotation to the tool synchronized with the axial movement to have the teeth of the tool advanced substantially on the lead of the thread thereof; and of imparting an additional movement in rotation to the tool after its axial advancement into mated position to advance the tool teeth to finish machining the sides of the blank teeth.

4. The method of machining a worm wheel of the enveloping type wherein a tool with mating teeth will deform teeth being machined which includes the steps; of mating a half-hob of the enveloping type having teeth of less thickness than said mating teeth and blank on correct axis relation with the half-hob shifted axially from correct mated position; of operating the half-hob and blank in synchronism; and of advancing the half-hob axially into mating position as it is rotated in synchronism with such advancement substantially on the lead of the hob teeth.

5. The method of machining a worm wheel of the enveloping type wherein a tool with mating teeth will deform teeth being machined which includes the steps; of mating a half-hob of the enveloping type having teeth of less thickness than said mating teeth and blank on correct axis relation with the half-hob shifted axially from correct mated position; of operating the half-hob and blank in synchronism; of advancing the half-hob axially into mating position as it is rotated in synchronism with such advancement substantially on the lead of the hob teeth; and of imparting a movement in rotation to the half-hob after it has reached mating position to advance the cutting edge of the teeth into the sides of the teeth of the blank.

6. The method of machining a worm gear element which includes the steps; of mounting a pair of tools on diametrically opposite sides of a blank with their axes in correct center relation but shifted axially out of mating position; of shifting said tools in the same direction while rotating them in the opposite direction in synchronism to have the advancement occur on the lead of the helical teeth; and stopping said advancement when the tools reach exact mating relation with the teeth of one tool finishing the teeth of one side of the blank, while those of the other tool are finishing the opposite side of said teeth.

7. The method of machining a worm wheel which includes the steps; of maintaining a pair of half-hobs on diametrically opposite sides of the wheel blank with their axes in correct center relation, but shifted axially out of mating position; of shifting said half-hobs in the same direction while rotating them in the opposite direction in synchronism to have the advancement occur substantially on the lead of the half-hob teeth, and stopping said advancement when the half-hobs reach exact mating relation with the teeth of one half-hob finishing the teeth on one side of the blank while those of the other half-hob are finishing the opposite side of said teeth.

8. The method of machining a worm wheel which includes the steps; of mounting a pair of half-hobs on a shaft which is in correct center relation with the shaft of the blank with the half-hobs spaced from each other out of mating relation with said blank; of shifting said half-hobs toward each other while rotating them in the opposite direction in synchronism to have the advancement occur substantially on the lead of the half-hob teeth; and stopping said advancement when the half-hobs reach exact mating relation with the teeth of one half-hob finishing the teeth on one side of the blank while those of the other half-hob are finishing the opposite side of said teeth.

9. The method of machining a worm wheel of the enveloping type which includes, mating a half hob of the enveloping type with a worm wheel blank with the axis of said hob in proper tangential position with respect to said blank, rotating said hob and blank in synchronism, moving said hob axially and at the same time rotating said hob along a lead substantially equal to the lead of the hob teeth, and subsequently imparting a rotational movement to said hob to advance the cutting edges of the teeth into the sides of the teeth of the worm blank.

10. The method of machining a worm wheel which includes the steps of maintaining a pair of half hobs on proper axes with respect to the axis of a worm wheel blank to be machined but with said hobs shifted axially out of mating position, of shifting said half hobs along their axes in a direction generally tangential to the worm wheel blank to be finished while rotating them along a lead equal to the lead of the teeth of said half hobs, discontinuing the axial advancement of said half hobs when the same have reached exact mating relation with the worm wheel and rotating said hobs one in one direction and one in the opposite direction relatively to each other to an extent sufficient so that one of said half hobs serves to finish one side of the teeth of the blank while the other of said hobs serves to finish the opposite sides of the teeth of said blank.

GEORGE R. SCOTT.